United States Patent [19]

Lu

[11] Patent Number: 4,615,942
[45] Date of Patent: Oct. 7, 1986

[54] OPAQUE PEARLESCENT FILMS CONTAINING BLENDS OF POLYMERS FOR IMPROVED DISPERSION OF INCOMPATIBLE POLYMER PHASE

[75] Inventor: Pang-Chia Lu, Pittsford, N.Y.

[73] Assignee: Mobil Oil Corporation, New York, N.Y.

[21] Appl. No.: 686,808

[22] Filed: Dec. 27, 1984

[51] Int. Cl.$^4$ .......................... B32B 5/16; B32B 27/06
[52] U.S. Cl. .................................... 428/327; 428/332; 428/474.4; 428/475.5; 428/480; 428/500
[58] Field of Search ............... 428/327, 364, 480, 332, 428/349, 474.4, 475.5, 500; 526/348.6

[56] References Cited

U.S. PATENT DOCUMENTS 4,076,698  2/1978  Anderson et al. ............... 526/348.6
4,377,616  3/1983  Ashcraft et al. ................ 428/327 X
4,510,743  4/1985  de Kroon ........................ 428/364 X

*Primary Examiner*—Thomas J. Herbert
*Attorney, Agent, or Firm*—Alexander J. McKillop; Michael G. Gilman; Edward J. Trojnar

[57] ABSTRACT

Opaque pearlescent polymer films, e.g., polypropylene, containing finely dispersed particles of an incompatible polymer, e.g., nylon, are improved by blending a polymer compatible with the polymer forming continuous film phase to alter its melt rheology and to cause dispersion of the incompatible polymer in small spherical particles with reduced stringiness.

14 Claims, No Drawings

OPAQUE PEARLESCENT FILMS CONTAINING BLENDS OF POLYMERS FOR IMPROVED DISPERSION OF INCOMPATIBLE POLYMER PHASE

CROSS-REFERENCE TO RELATED APPLICATIONS

In my concurrently filed application entitled "OPAQUE PEARLESCENT FILMS CONTAINING DISPERSED INCOMPATIBLE POLYMER AND POLYMERIC INTERFACIAL AGENT" there are disclosed opaque polymeric films containing a dispersed phase of incompatible polymer as the opacifying agent. Improved opacity is obtained by virtue of finer dispersion of the incompatible polymer by the use of a polymeric interfacial agent.

BACKGROUND OF THE INVENTION

Opaque polymeric films in which the opacifying agent is finely divided polymer dispersed in the continuous film polymer phase are described in U.S. Pat. No. 4,377,616, which is incorporated herein by reference in entirety. In the patent the film is prepared by melting a mixture of a major proportion of a film forming polymer such as polypropylene and a minor proportion of an incompatible polymer which has a higher melting point, such as nylon, at a temperature sufficient to melt the incompatible polymer and to disperse it in the film forming polymer, extruding the mixture into a film and biaxially orienting the film. The dispersed incompatible polymer provides sites for the formation of voids surrounding the dispersed polymer particles when the film is oriented. These voids provide opacity and give the film an attractive pearlescent sheen. Reduction of the size of the dispersed particles and reduction of the occurrence of stringiness in those particles, as sometimes occurs, results in a film having improved opacity and better appearance. Such improvements are provided in accordance with this invention.

SUMMARY OF THE INVENTION

This invention relates to improvements in opaque polymeric films containing finely dispersed incompatible polymer as the opacifying agent. Particle size and stringiness in the dispersed incompatible polymeric phase are reduced by incorporating a rheology modifying agent compatible with the film forming polymers.

DETAILED DESCRIPTION OF THE INVENTION

The improvements obtained in accordance with this invention in reduced particle size and in reduced stringiness of the dispersed incompatible polymeric phase are obtained by incorporating a rheology modifying agent which is compatible with the film forming polymer. A variety of materials are believed to be suitable. Linear low density copolymers of ethylene and higher olefins can advantageously be used. Such copolymers are widely commercially available and are described in U.S. Pat. No. 4,076,698 which is incorporated by reference herein. Linear low density copolymers generally have a density of about 0.90 to 0.94 and contain a comonomer which preferably a monoolefin having from 4 to 8 carbon atoms, such as 1-butene, 1-hexene, 4-methyl-1-pentene, and 1-octene.

Generally, it is believed that ethylene polymers which are compatible with the preferred film forming polypropylene polymer are useful. Such polymers include low density polyethylene and ethylene propylene rubbers.

It is also considered necessary that the additive resin which is compatible with the film forming polymer be incompatible with the resin which forms the dispersed particle phase. In the preferred combination where polypropylene is the film forming polymer and nylon is the dispersed polymer, linear low density polyethylenes meet the requirements for compatibility for the polypropylene and incompatibility with the nylon.

The additive polymer is incorporated in effective amounts which are generally in the range of 5 to 25 wt % based on the weight of resins in the film forming layer.

The methods for preparing the films described in U.S. Pat. No. 4,377,616 can be used herein. As described therein, the films can contain additional components such as inorganic fillers and the like. Similarly, the films can contain one or more additional layers in order to achieve high gloss, heat sealability or other desired characteristics.

This invention is illustrated by the following non-limiting example in which all parts are by weight unless otherwise specified.

EXAMPLE

A resin blends were prepared by melting the polymeric components, cast extruding the melts and biaxially orienting the films. The films were examined under an optical microscope particle size and shape of the dispersed nylon phase.

|  | CONTROL | EXAMPLE |
| --- | --- | --- |
| Polypropylene | 85 | 68 |
| Nylon-6 | 15 | 15 |
| LLDPE | — | 17 |
| Particle Size (Microns) | 8–10 | 3–8 |
| Strings | Many | Very Few |

The LLDPE additive was a linear low density copolymer of ethylene and 1-butene having a density of about 0.92.

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

I claim:

1. In an opaque to translucent, biaxially oriented melt extruded polymeric film comprising a continuous phase of polypropylene; and a discontinuous dispersed phase of a finely divided second polymer comprising a polyamide or polyester which is incompatible with said first polymer; the improvement comprising a blend of said first polymer with a third polymer which is compatible therewith but is incompatible with said second dispersed polymer selected from the group consisting of ethylene-propylene copolymers, low density polyethylene and linear low density polyethylene; said third polymer altering the character of said first polymer so that the dispersed second polymer is formed in small particles with fewer stringy particles than the film made without said compatible polymer.

2. The film of claim 1 in which said second polymer has a higher melting point than said first polymer.

3. The film of claim 1 in which said second polymer is a polyamide.

4. The film of claim 1 in which said second polymer is a polyester.

5. The film of claim 1 having a transparent, thermoplastic coating on at least one surface thereof.

6. The film of claim 1 in which said compatible polymer is an ethylene-propylene copolymer.

7. The film of claim 6 in which said second polymer is a polyamide.

8. The film of claim 7 in which said average particle size of said second polymer is less than 8 microns.

9. The film of claim 7 having a transparent, thermoplastic coating on at least one surface thereof.

10. The film of claim 7 in which said polyamide is nylon-6.

11. The film of claim 10 in which said average particle size of said second polymer is less than 8 microns.

12. The film of claim 10 having a transparent, thermoplastic coating on at least one surface thereof.

13. The film of claim 1 in which said average particle size of said second polymer is less than 8 microns.

14. The film of claim 13 having a transparent, thermoplastic coating on at least one surface thereof.

* * * * *